April 4, 1944.　　　　E. C. GUEDON　　　　2,346,071
PHONOGRAPHIC APPARATUS
Filed Feb. 28, 1942　　　　3 Sheets-Sheet 1
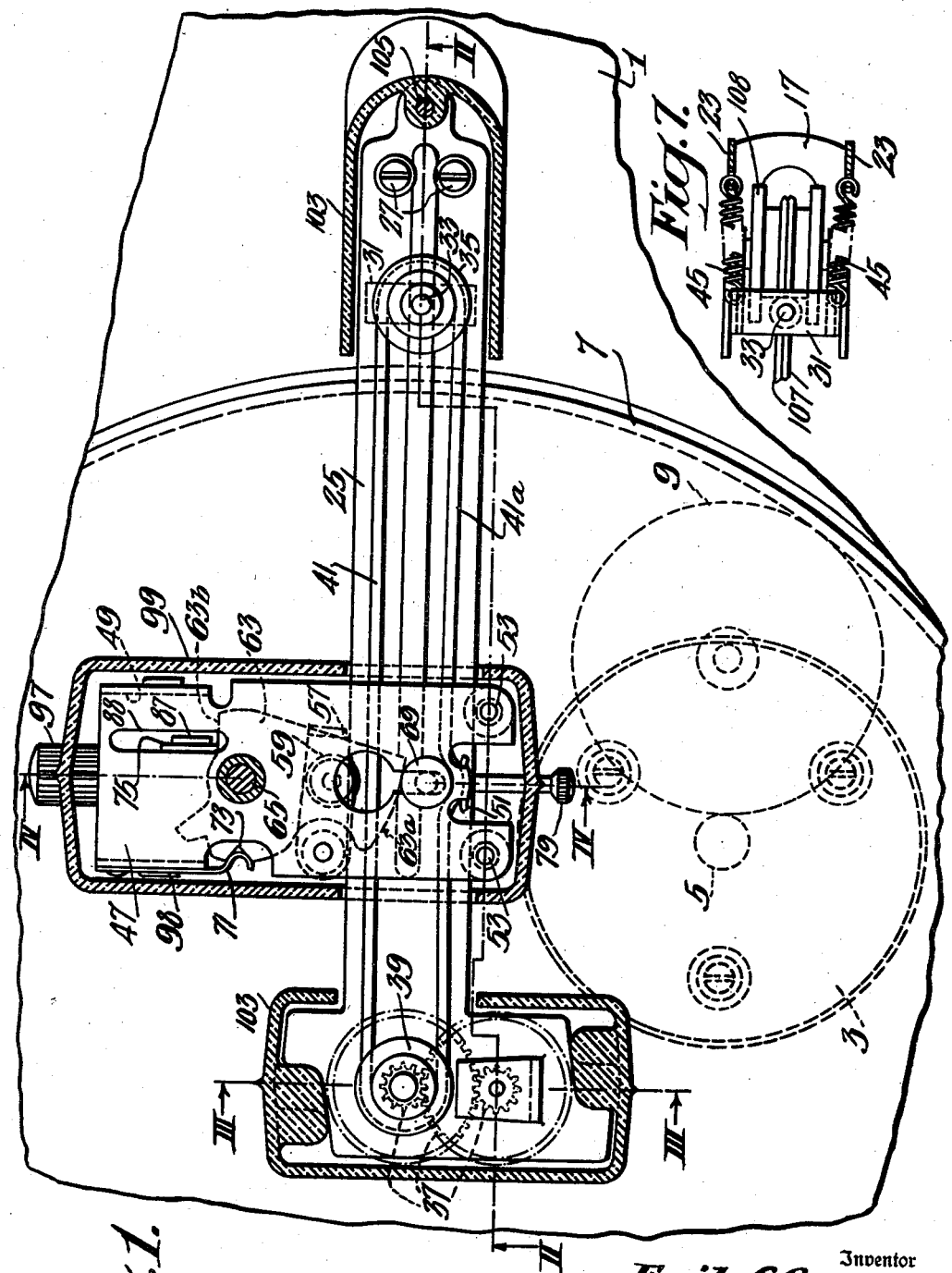
Inventor
Emile C. Guedon
By
C. D. Tucker
Attorney

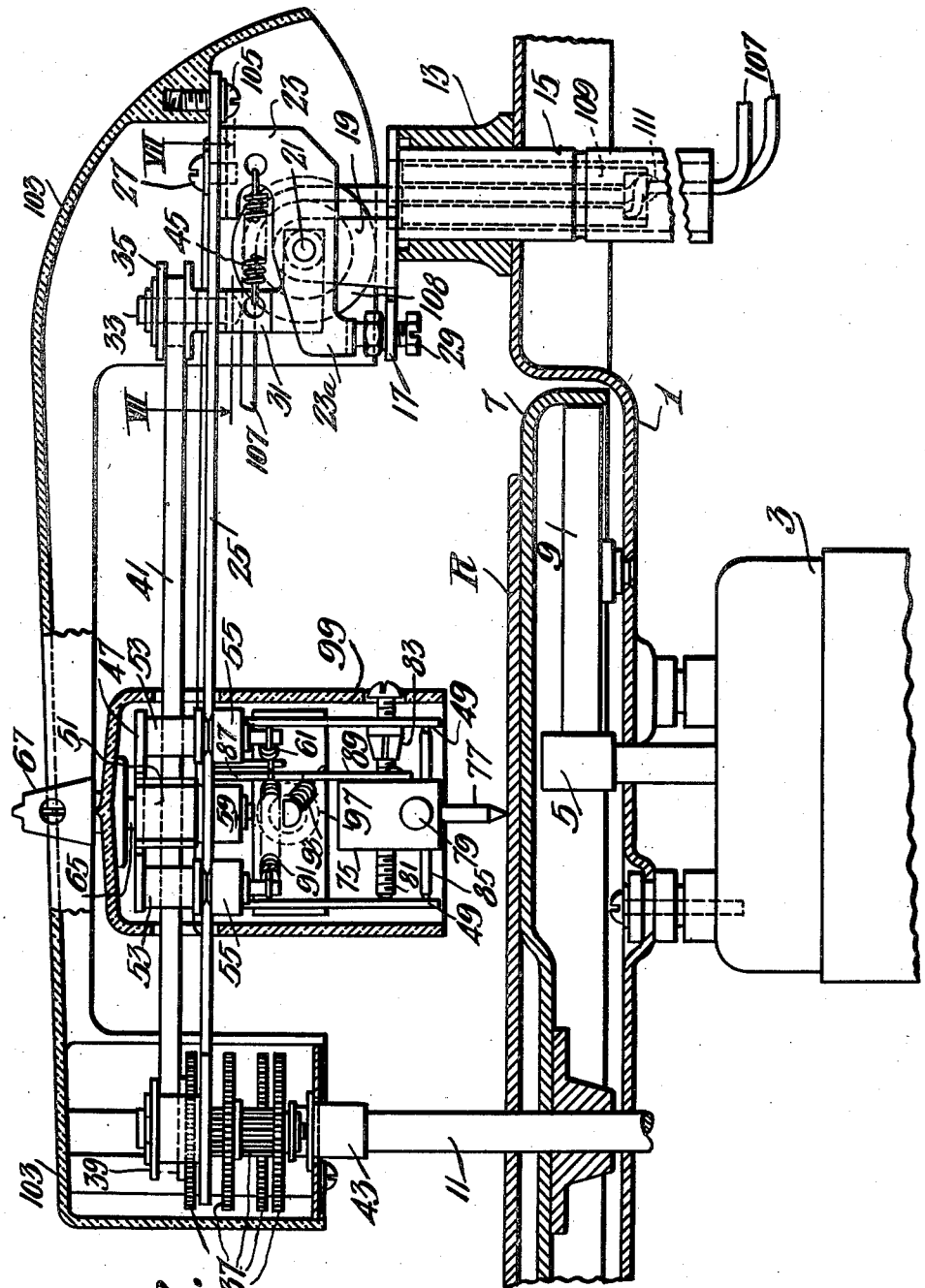

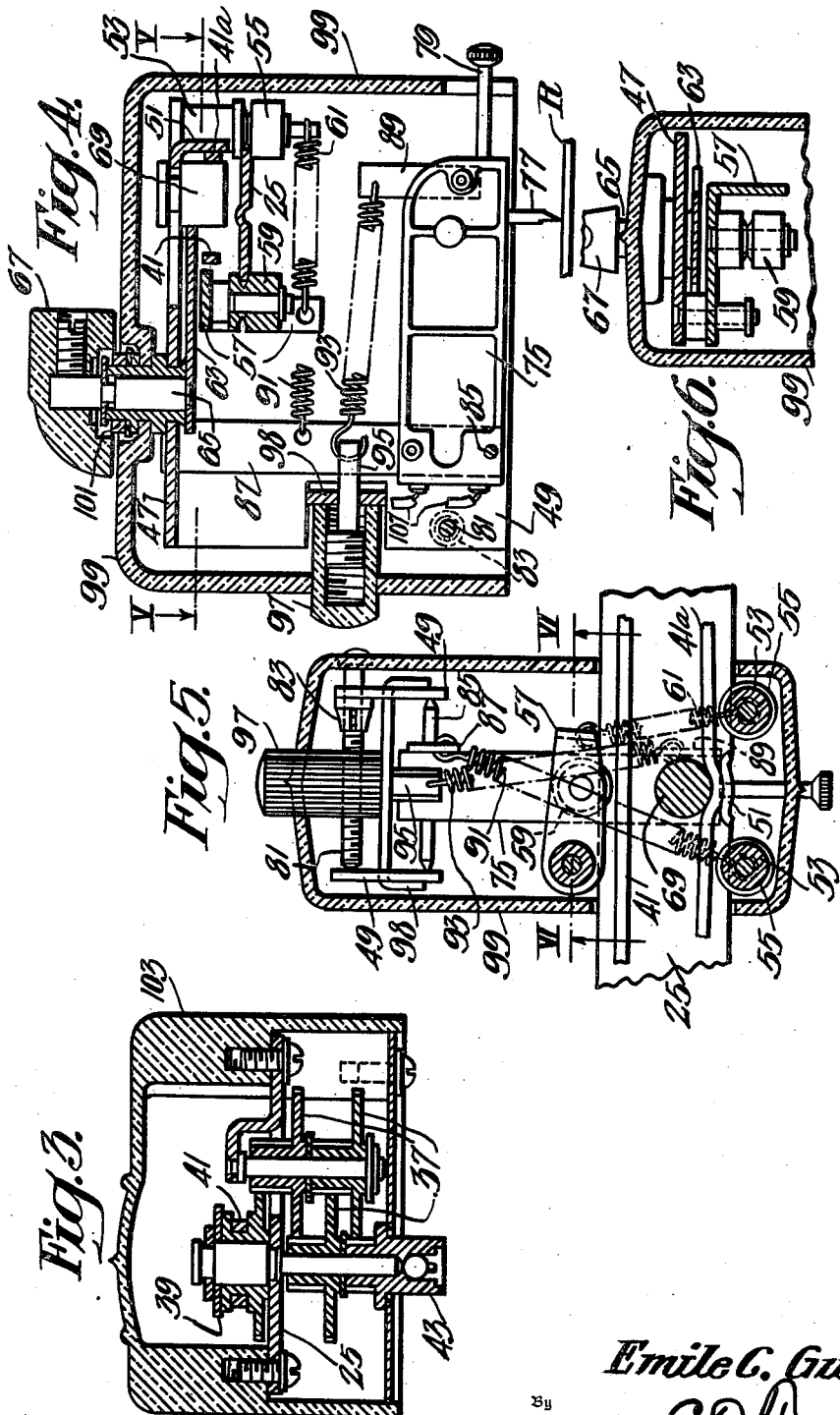

Patented Apr. 4, 1944

2,346,071

UNITED STATES PATENT OFFICE 2,346,071

PHONOGRAPHIC APPARATUS

Emile C. Guedon, Audubon, N. J., assignor to Radio Corporation of America, a corporation of Delaware Application February 28, 1942, Serial No. 432,866

3 Claims. (Cl. 274—13)

This invention relates to phonographic apparatus and more particularly to a recording device especially adapted for use in the home, the primary object of my present invention being to provide an improved home recording device which can be employed for recording programs locally upon lacquer surfaced or similar discs for immediate playback.

More particularly, it is an object of my present invention to provide an improved home recording device as aforesaid which is simple in construction, easy to operate, and highly efficient in use.

Another object of my present invention is to provide an improved home recording device as aforesaid by means of which the available recording area will be utilized to the greatest advantage, with no loss of such area.

Still another object of my present invention is to provide a home recording device as aforesaid by means of which the recording element will be fed across the record at a uniform rate.

A further object of my present invention is to provide an improved home recording device wherein the pressure of the recording element on the record blank and the depth of cut of the recording element can be easily controlled and adjusted.

Still a further object of my present invention is to provide, in an improved home recording device employing an electrical translating unit to which are connected flexible conductors which move with the translating unit, means whereby the slack in the conductors is always taken up regardless of the direction in which the translating unit moves over the record, thereby avoiding tangling and breaking of the conductors.

In accordance with one form of my invention, I provide a supporting arm or bracket which extends radially across the record and carries a pair of pulleys over which a flexible belt or band is trained. Rotation is imparted to one of the pulleys and to the aforementioned belt from the turntable spindle through a train of gears. The signal translating or recording unit is pivotally mounted on a carriage for movement thereof toward and away from the record so as to either bring the recording needle into engagement with the record or move it out of engagement therewith, as may be desired. The carriage itself is slidably mounted on the supporting arm, and a manually operable cam is arranged thereon to either simultaneously move the cutter head into engagement with the record and couple the carriage to one strand of the endless belt through a suitable clutch upon movement of the cam into one of two positions which it is adapted to occupy, or raise the cutter head from the record and simultaneously disconnect the carriage from the aforementioned belt strand upon movement of the cam to the other of its two positions. Thus, when it is desired to stop the recording, the cam is moved to the second of its above mentioned positions. When the cam is thereafter returned to the first of its above mentioned positions, the recording needle is brought back to the same point on the record from which it was raised, so that no loss of recording area results. Suitable adjusting means is provided in connection with the support of the cutter head on its carriage for regulating the pressure of the needle on the record and for controlling the depth of cut of the groove formed by the recording needle.

The novel features that I consider characteristic of my invention are set forth with particularity in the appended claims. The invention itself, however, both as to its organization and method of operation, as well as additional objects and advantages thereof, will best be understood from the following description of one embodiment thereof, when read in connection with the accompanying drawings in which Figure 1 is a plan view, partly in section, of a recording device according to this invention, Figure 2 is a sectional view taken substantially along the line II—II of Fig. 1, Figure 3 is a sectional view taken on the line III—III of Fig. 1, Figure 4 is a sectional view taken on the line IV—IV of Fig. 1, Fig. 5 is a sectional view taken on the line V—V of Figure 4, Figure 6 is a fragmentary sectional view taken on the line VI—VI of Fig. 5, and Figure 7 is a fragmentary sectional view taken on the line VII—VII of Fig. 2.

Referring more particularly to the drawings, wherein similar reference characters designate corresponding parts throughout, there is shown a motor board 1 carrying a driving motor 3 having on its drive shaft a pulley 5 which drives a turntable 7 through an intermediate idler wheel 9. The turntable 7 is provided with a spindle 11 which rotates therewith in well known manner and which is adapted to threadedly receive a record blank R supported on the turntable 7 for rotation thereby.

Fixed to the motor board 1 is a bushing 13 which receives a hollow shaft or sleeve 15 for rotation therein, the sleeve 15 having secured thereto at its upper end a forwardly extending plate 17 from which a pair of opposed arms 19 extend in an upward direction. Pivotally mounted on a pin 21 on the arms 19 is a somewhat U-shaped bracket 23 to the cross arm of which is secured a main supporting arm or bracket 25, as by means of a pair of screws 27, the arm 25 extending radially across the turntable 7. The bracket 23 has a forwardly and downwardly extending arm 23a with which a set screw 29 on the plate 17 cooperates to limit the pivotal movement of the bracket 23 and the supporting arm 25 in a downward direction relative to the record R.

Also pivotally mounted on the pivot pin 21 is a second somewhat U-shaped bracket 31 having a post 33 which extends upwardly through a suitable opening in the main supporting arm 25, the post 33 carrying a rotatable pulley 35 on its upper end above the supporting arm 25. The opposite end of the arm 25 carries a gear train 37 terminating in a pulley 39 also arranged above the supporting arm 25, as clearly shown in Fig. 2. A flexible, endless belt or band 41 is trained around the pulleys 35 and 39 and constitutes the driving element for the cutter head more particularly described hereinafter. The gear train 37 may be provided with a suitable nipple or other coupling 43 which has driving engagement with the upper end of the turntable spindle 11, the belt 41 thus being driven from the spindle 11 through the nipple 43, the gear train 37, and the driving pulley 39. A pair of coil springs 45 which connect the brackets 23 and 31 tend constantly to rotate the bracket 31 and the pulley 35 in a clockwise direction relative to the bracket 23, as viewed in Fig. 2, to thereby maintain the belt 41 under suitable tension.

Slidably mounted on the main supporting arm 25 is a carriage 47 formed with a pair of opposed, downwardly extending side arms 49 and a short, downwardly extending tab or the like 51, the latter being disposed adjacent one of the strands of the belt 41, for example, the strand 41a. The carriage 47 is provided with a pair of downwardly extending posts 53 on which are rotatably mounted a pair of grooved rollers 55 in fixed relation to the carriage 47. Pivotally mounted on the carriage 47, as clearly shown in Fig. 6, is a bracket 57 on which is rotatably mounted a grooved roller 59. The supporting arm 25 is received along one of its edges in the grooves of the fixed rollers 55 and along its opposite edge in the groove of the movable roller 59, as best seen in Fig. 4, a spring 61 serving to draw the roller 59 toward the rollers 55 to insure firm engagement of all three rollers with the supporting arm 25. As the carriage 47 moves along the arm 25, the rollers 55 and 59 will serve as roller bearings therefor.

Pivotally mounted on the carriage 47 is a cam 63 having an upwardly extending operating shaft 65 to which is secured an operating handle or knob 67. The carriage 47 slidably carries a roller 69 in proximity to the belt strand 41a for cooperating with the tab 51 as a clutch to lock and unlock the carriage to the belt. When the knob 67 is turned manually in one direction, the cam 63 moves with it in the same direction and its cam edge 63a forces the roller 69 against the belt strand 41a to clamp this belt strand between it and the tab 51, as clearly shown in Fig. 1. Thus, the carriage becomes locked to the belt and moves therewith longitudinally along the arm 25. The clamping pressure on the belt strand 41a can be regulated by bending the tab toward or away from the roller 69. When the knob 67 is turned manually in the opposite direction, the cam edge 63a is removed from engagement with the clamping roller or clutch element 69 and the belt strand 41a pushes the roller 69 away from the tab 51 due to its inherent resilience. As a result, the carriage 47 becomes uncoupled from the belt 41 and the belt may continue to rotate without moving the carriage. A suitable detent, such as a spring blade 71 secured to one of the side arms 49, cooperates with a pair of V-notches 73 in the cam 63 to releasably retain the cam in either one or the other of its adjusted positions.

Pivotally carried by the side arms 49 of the carriage 47 by means of a pivot shaft 85 is an electromechanical translating device 75, such as a cutter provided with a cutting needle or stylus 77 clamped in place by a needle screw 79 in well known manner. A screw 81 which is threadedly received in a split nut 83 on one of the arms 49 serves to adjust the clamping pressure of the side arms 49 of the carriage on the pivotal bearing shaft 85 of the cutter or the like 75 to prevent rattling of the cutter and to insure uniform groove spacing.

The cutter unit 75 may be provided with a pair of upwardly extending posts or arms 87 and 89, the post 87 extending upwardly into the path of movement of a second cam edge 63b of the cam 63 and through a slot 88 in the carriage 47. A spring 91 connected between the post or arm 87 and one of the fixed posts 53 assists gravity in constantly urging the cutter head 75 in a clockwise direction on its pivot shaft 85, as viewed in Fig. 4, that is, tending constantly to bring the cutting needle 77 into engagement with the record R. The cam edge 63b is so shaped and located with respect to the adjacent edge of the arm 87 that, when the knob 67 is manipulated to cause the cam edge 63a to advance the roller 69 into clamping relation with the belt strand 41a, the cam edge 63b will recede from the arm 87, thereby permitting gravity and the spring 91 to lower the needle 77 down onto the record. However, when the knob 67 is manipulated in the opposite direction to effect release of the belt strand 41a, the cam edge 63b engages the adjacent edge of the arm or post 87, thereby swinging the cutter head 75 in a counterclockwise direction, as viewed in Fig. 4, to raise the needle 77 from the record. Thus, the manually operable knob 67 and its associated cam 63 are effective either to lock the cutter head carriage to the driving belt while simultaneously bringing the cutting needle 77 into engagement with the record, or to unlock the carriage from the driving belt while simultaneously raising the needle from the record. When once the cutter is removed from the record and its carriage unlocked from the belt, the cutter mechanism will remain in its then position irrespective of continued movement of the belt, and when the mechanism is returned to recording position, the needle 77 will take up the recording from the point where it last left the record, so that none of the recording area is lost.

The pressure which the needle will apply to the record, and thereby the depth of groove cut in the record blank R, may be easily adjusted by means of a compensating spring 93 connected between the post or arm 89 and an eye screw 95 which is threadedly received in a hollow, internally threaded, manually operable knob 97 which bears against a plate 98 carried by the arms 49. Preferably, a casing 99 is placed around the carriage 47 and the parts carried thereby, the casing 99 being secured to the carriage by one or more lock nuts 101. Also, a casing 103 may be placed around the main supporting arm 25 and the parts carried thereby, as clearly shown in Fig. 2, the casing 103 being held in place by a plurality of screws 105.

The translating device 75 has suitably connected thereto a pair of flexible conductors or leads 107 which may serve as input leads if the device 75 is a recording unit or as output leads if the device 75 is a reproducing unit. As the carriage 47 moves along the supporting arm 25 toward the center of the record R, it is obvious that the conductors 107 will follow it. On the other hand, when the carriage 47 moves in the opposite direction, the leads will slacken up. To take up the slack, the leads 107 are trained around a pulley 108 on the pin 21 and extend down through a hollow weight or mass 109 which is freely slidable in the hollow shaft or sleeve 15, a knot or the like 111 formed in the leads 107 serving to retain the weight 109 in place. Thus, the leads 107 are prevented from becoming slack and possibly tangled and worn, or even broken.

From the foregoing description, it will be apparent that I have provided a novel and simple home recording device which can be used successfully even by those unskilled in the technique of making phonograph recordings. Although I have shown and described but one embodiment of my invention, it will be obvious to those skilled in the art that many other modifications thereof, as well as changes in the one described, are possible within the scope of my invention. I therefore desire that my invention shall not be limited except insofar as is made necessary by the prior art and by the spirit of the appended claims.

I claim as my invention:

1. In phonographic apparatus, the combination of a turntable including a spindle and adapted to support a record threaded on said spindle, a supporting arm extending radially across said turntable, a pair of pulleys on said arm, power transmitting means coupling said spindle to one of said pulleys whereby rotation of said spindle will effect rotation of said last named pulley, an endless belt trained around said pulleys for movement in response to said last named pulley, a carriage slidably mounted on said supporting arm, a signal translating device pivotally mounted on said carriage for movement into and out of engagement with the record, a clutch device for connecting said carriage to said belt, said clutch device comprising relatively fixed and movable members on said carriage, and a manually operable cam associated with said clutch device and with said translating device, said cam being pivotally mounted for movement into one position wherein it causes said translating device to be moved into engagement with the record while simultaneously causing said movable member to move toward said fixed member to clamp one strand of said belt therebetween and thereby connect said carriage to said belt, and into another position wherein it causes said translating device to be moved out of engagement with the record while simultaneously freeing said movable member to move back away from said fixed member to thereby release said strand and disconnect said carriage from said belt.

2. The invention set forth in claim 1 characterized by the addition of means for releasably locking said cam in either one of its said positions.

3. In phonographic apparatus, the combination of a turntable including a spindle and adapted to support a record threaded on said spindle, a supporting arm extending radially across said turntable, a pair of pulleys on said arm, power transmitting means coupling said spindle to one of said pulleys whereby rotation of said spindle will effect rotation of said last named pulley, an endless belt trained around said pulleys for movement in response to said last named pulley, a carriage, a plurality of spaced, grooved rollers on said carriage certain ones of which are relatively fixed on said carriage and at least one of which is movably mounted on said carriage for movement toward and away from said fixed rollers, said supporting arm having one of its edges received in the grooves of said fixed rollers and its opposite edge received in the groove of said movable roller whereby said carriage is slidable on said supporting arm, spring means associated with said movable roller constantly urging said movable roller toward said fixed rollers whereby said supporting arm is firmly gripped between said rollers, a signal translating device pivotally mounted on said carriage for movement into and out of engagement with the record, a clutch device for connecting said carriage to said belt, and a manually operable cam associated with said clutch device and with said translating device, said cam being pivotally mounted for movement into one position wherein it causes said translating device to be moved into engagement with the record while simultaneously causing said clutch device to connect said carriage to said belt, and into another position wherein it causes said translating device to be moved out of engagement with the record while simultaneously causing said clutch device to disconnect said carriage from said belt.

EMILE C. GUEDON.